United States Patent [19]

Epstein et al.

[11] Patent Number: 5,402,532
[45] Date of Patent: Mar. 28, 1995

[54] DIRECT DISPLAY OF CSG EXPRESSION BY USE OF DEPTH BUFFERS

[75] Inventors: David A. Epstein; Jaroslaw R. Rossignac, both of Ossining; Jeffrey W. Wu, New York, all of N.Y.

[73] Assignee: International Business Machines Corporation, Armonk, N.Y.

[21] Appl. No.: 316,075

[22] Filed: Sep. 30, 1994

Related U.S. Application Data

[63] Continuation of Ser. No. 672,058, Mar. 12, 1991, abandoned.

[51] Int. Cl.⁶ ............................................. G06T 17/10
[52] U.S. Cl. .................................. 395/122; 395/120; 395/126
[58] Field of Search ............... 395/122, 121, 120, 119, 395/126, 128, 141; 345/141; 382/25, 26

[56] References Cited

U.S. PATENT DOCUMENTS

| | | | |
|---|---|---|---|
| 5,083,287 | 1/1992 | Obata et al. | 395/126 |
| 5,115,402 | 5/1992 | Matsushiro et al. | 395/141 |
| 5,200,740 | 4/1993 | Paxton et al. | 345/141 |

FOREIGN PATENT DOCUMENTS

0393309 1/1990 European Pat. Off. .

OTHER PUBLICATIONS

"Dynamic Detection of Hidden–Surfaces Using a MIMD Multiprocessor", O. Frieder et al., 3rd Annual IEEE Symposium on Computer–Based Medical Systems Jun. 3–6, 1990 Track 1; Communications and Image Processing/Session 3 pp. 44–51.
"A new Space Subdivision Method for Ray Tracing CSG Modelled Scenes", B. Arnaldi et al., The Visual Computer (1987) pp. 98–108. Search Report in Re-EP9210 1265, dated Nov. 23, 1993.
Boolean Operations in Solid Modelling: Boundary Evaluation and Merging Algorithms, A. Requicha et al., Jan. 1985, pp. 30–44, Proc. of the IEEE, vol. 73, No. 1.
Methods for Computer Aided Design of Free-Form Objects, Mathematics and Computer Science Series, No. 56, Helsinki University of Technology, Finland 1990, pp. 3–60.

Primary Examiner—Mark K. Zimmerman
Assistant Examiner—Michael Smith
Attorney, Agent, or Firm—Perman & Green

[57] ABSTRACT

Apparatus and method for generating displayable information expressive of a three dimensional solid object. The apparatus includes a processor (12,16) for expressing the object in a Constructive Solid Geometry representation thereof so as to be comprised of one or more primitive objects. The apparatus further includes a processor (18, 20) for repetitively evaluating the one or more primitive objects to determine displayable faces thereof. A depth interval buffer (20) is responsive to the operation of a scan conversion processor (18) for detecting when a predetermined number of repetitive evaluations occur without causing a change in the determination of a displayable face and for causing the operation of the evaluation processor to terminate. Toleranced depth tests are used to remove dangling faces or edges and to properly handle coincident faces. Pixel-centering is employed to improve the accuracy of depth tests and to identify pixels upon which a product projects. Shadowing is accomplished using a two-pass scan-conversion technique with an auxiliary shadow-buffer (ZS).

36 Claims, 7 Drawing Sheets

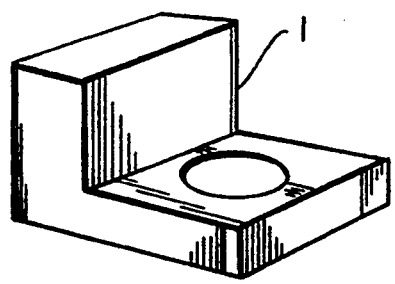
FIG. 1
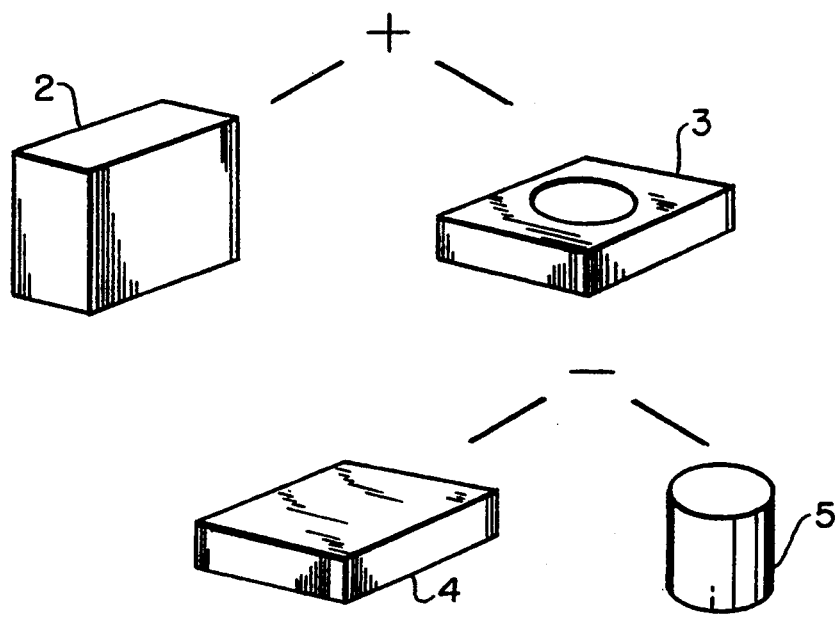
FIG. 3
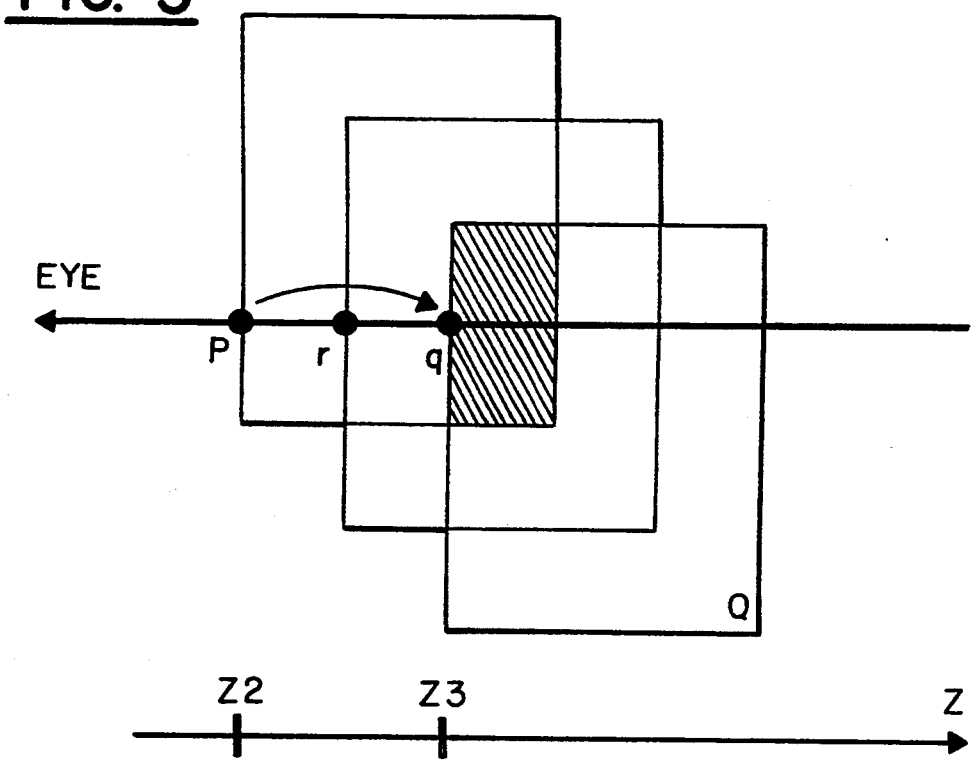

V = VISIBLE
S = SHADOW
h = HIDDEN

DIRECT DISPLAY OF CSG EXPRESSION BY USE OF DEPTH BUFFERS

This is a continuation of application Ser. No. 07/672,058, filed on Mar. 12, 1991, now abandoned.

FIELD OF THE INVENTION

This invention relates generally to computer display apparatus and method and, in particular, to apparatus and method for rendering Constructive Solid Geometry (CSG) expressions.

BACKGROUND OF THE INVENTION

A solid model representing, by example, a part or a tool may be specified by combining subsolids or primitive volumes through set theoretic Boolean operations such as union, intersection, and difference of sets. The solid is represented by a set theoretic Boolean expression which can be efficiently stored within a computer memory in a binary tree representation or, more precisely, in a binary directed rooted acyclic graph.

FIG. 1 is an illustrative binary tree representation of a solid (1) which is composed of the union of two subsolids (2) and (3). Subsolid (3) is composed of the difference between the block primitive (4) and the cylindrical primitive (5). The form of such a tree is directly obtained by parsing the Boolean expression $(2)+((4)-(5))$. The root of the tree (solid 1) is associated with the solid defined by the Boolean expression. Internal nodes of the tree correspond to Boolean operations and are associated with subsolids. Leaves of the tree are associated with primitive volumes, which often are the intersection of relatively simple algebraic half-spaces, that is, regions of space where a simple polynomial function of three space coordinates has a non-positive value. For example, a ball of radius R centered at the origin is a half-space defined by the function $x^2+y^2+z^2-R^2 \leq 0$. An arbitrarily positioned and oriented primitive volume can be described in terms of a rigid motion transformation, a combination of a rotation with a translation, and of a congruent primitive volume defined in a convenient local coordinate system. Simple primitive volumes can be represented by their type, such as sphere, cylinder or cone, and by a relatively few intrinsic parameters such as radius, length and apex angle. Such a tree is known as a Constructive Solid Geometry representation, and will be abbreviated hereinafter as CSG.

The positions and dimensions, or intrinsic parameters of the primitive volumes may be expressed in terms of a few primary parameters which characterize a particular member in an entire family of solids represented by the CSG tree. The resulting parameterized CSG representation can therefore be conveniently used to model, for example, an assembly of parts whose dimensions vary within tolerance limits.

CSG objects are often constructed from primitives whose faces overlap. However, Boolean operations on solids having overlapping boundaries may create a non-regularized set. Therefore, CSG operators have conventionally been modified to always produce regularized solids. However, these modifications require additional processing.

Shading a CSG solid through boundary evaluation is generally an expensive data processing procedure. Efficient, direct approaches for shading CSG models through ray-casting are available for facetted models and for Boolean combinations of quadric half-spaces. However, ray-casting involves computing a large number of ray-surface intersections and becomes particularly inefficient when higher degree algebraic or parametric surfaces are involved.

In that surface evaluation is faster than ray-surface intersection, scan-conversion techniques with adaptive tesselation are often used for shading boundary models. A hardware depth-buffer (z-buffer) is used for automatically selecting the visible faces of the model. Because the faces of a CSG solid are not directly available, the depth-buffer visibility test must be combined with a trimming process that selects the portions of primitive faces that lie on the solid.

A software implementation of this selection has been combined with a hardware depth-test by one of the present inventors and is described in an article entitled "Depth buffering display techniques for constructive solid geometry", IEEE, Computer Graphics and Applications, vol. 6, no. 9, pp 29–39, Sep. 1986 by J. R. Rossignac and A. A. G. Requicha. This technique generally involves comparing a point P on a front-facing face of a primitive A to a depth stored in the z-buffer of the corresponding pixel. If P is in front of what is stored in the z-buffer, it is "classified", i.e. tested, against the CSG graph. Points on the boundary of the solid are rendered into the z-buffer. Points inside of or outside of the boundary of the solid are discarded. A point inside the solid is automatically rejected by the z-buffer visibility test. Therefore, performance is improved by avoiding a test of P against certain primitives in the graph by classifying P against an I-zone of A, the I-zone being an intersection of a subset of the nodes of the original CSG graph. If P lies inside the I-zone of A, it lies on the final solid or inside of the final solid.

Scan-conversion is a known technique that generates surface points that project onto individual screen pixels along the viewing direction. The depth of the three dimensional points, computed along the viewing direction away from the viewer, may be stored in the z-buffer memory associated with the corresponding pixel. A three dimensional point whose depth is stored in some pixel's z-buffer is classified against a primitive by scan-converting the boundary of the primitive and computing the parity of the number of layers of the primitive's surface that are behind the point being tested. This is accomplished by comparing against the value stored in the z-buffer the depth values of surface points that project onto the same pixel as the tested point. Each time the depth of the scanned point is larger than the stored point a binary parity flag associated with that pixel is inverted.

To classify a point against a CSG expression, it is not sufficient to classify the point only against all primitives. Point-primitive classification results must further be combined according to a Boolean expression. For some simple Boolean expression, such as an intersection, no storage is necessary because the result may be formulated as a conjunction of Boolean results. The classification algorithm may process the primitives in any order and then stop as soon as one of the results is FALSE. This would be the case when, for example, the point was out of a primitive in a Boolean intersection. If all the primitives are processed and no FALSE result is found, the point is inside the solid defined by the Boolean expression.

However, the evaluation of more complicated CSG expressions presents a problem in that a large amount of temporary storage may be required for intermediate binary results. Usually a stack mechanism is used for the temporary storage. The required stack depth may reach the depth of the CSG graph.

In that the amount of system memory per pixel is limited it is not practical to provide a stack of arbitrary depth at each pixel. Yet, it is desirable to perform classification operations in parallel for all pixels, so as to minimize the number of required primitive scan-conversions.

A technique described by J. Goldfeather et al. "Near Real-Time CSG Rendering using Tree Normalization and Geometric Pruning" in IEEE CG&A, vol. 9, no. 3, pp. 20-28, June 1989, circumvents the memory limitation by converting the CSG expression into a significantly larger sum-of-product form in which primitive instances may be duplicated many times, thereby appearing in several products. Techniques for eliminating redundant (empty) products are also discussed.

In this technique primitive faces are first trimmed against the appropriate products using repeated primitive scan-conversions. The resulting trimmed faces are then merged using a final depth buffer for selecting the front-most faces among all the products. A z-buffer is used for both visible surface selection and for discarding faces interior to the solid.

It is noted however that products may interfere and, therefore, a front face of a product may not lie on the solid.

As a result, there is a need, in regard to the projective approach to CSG processing, for an efficient and accurate method for determining the visible front-faces of a product. In that depth-buffer comparisons are performed within the limited resolution of the z-buffer, there is a further need to correctly handle situations where faces of several primitives overlap or where a ray of a pixel intersects two adjacent faces very close to their common edge.

For both of these cases, due to scan-conversion round-off errors, computed depth values may not be accurate. However, despite these inherent inaccuracies, there remains the requirement to generate a displayable image that corresponds to a regularized version of the CSG expression. A solid is considered to be regularized when it is equal to the topological closure of its interior with respect to three-dimensional Euclidean space. Regularized solids therefore have, by definition, no dangling edges or faces. Thus, faces or edges that lie on several primitives, but are not bounding any three-dimensional volume in the final result, should not be displayed.

The following U.S. patents teach various aspects of image display and/or CSG rendering. In U.S. Pat. No. 4,609,917, Sep. 2, 1986, T. Y. Shen discloses a variation of a commonly used graphics architecture employing z-buffers. In U.S. Pat. No. 4,625,289, Nov. 25, 1986, A. P. Rockwood discloses a method of surface display in which points on the surface are generated by sampling a function describing the surface. A z-buffer is employed to find the nearest sampled point to the viewer for every pixel covered by the sampling. In U.S. Pat. No. 4,736,306, Apr. 5, 1988, Christensen et al., issued Apr. 5, 1988 disclose a boundary-to-CSG conversion technique. In U.S. Pat. No. 4,737,921, Apr. 12, 1988, Goldwasser, et al. disclose a multiprocessor system for displaying pixel data. Specifically, a hardware architecture is proposed for merging images (intensity and depth) that are computed in parallel by several processors, with a possibility for moving individual images in realtime shadowing processors are also provided in this system. In U.S. Pat. No. 4,821,214, Apr. 11, 1989, T. W. Sederberg discloses a technique for obtaining a freeform deformation of a model through the use of a trivariate vector rational polynomial. The method is said to be applicable to CSG solid modelling systems. In U.S. Pat. No. 4,825,391, Apr. 25, 1989, D. M. Merz discloses a visible surface architecture in which span comparisons are used instead of depth memory. In U.S. Pat. No. 4,855,938, Aug. 8, 1989, J. Lopez et al. disclose a method of displaying visible lines of polygons. A z-buffer is initialized with special z values for the polygon edges. The polygon is rasterized into the z-buffer and only those pixels which still have the special z-values are appropriately colored. In U.S. Pat. No. 4,907,174, Mar. 6, 1990, C. Priem discloses the use of a range of z-depths in a portion of a z-buffer to identify which graphics display window a z-buffer is dedicated to.

Finally, in U.S. Pat. No. 4,858,149, Aug. 15, 1989, P. Quarendon discloses solid modeling to render CSG objects. A universe is decomposed recursively into smaller and smaller cubes until the cube does not intersect any primitive's boundary or until the cube is smaller than a current resolution. Although this patent is relevant to the solution of the problem solved by the present invention, the approach is less efficient and does not employ hardware depth-buffers.

Researchers have implemented a hardware algorithm for trimming primitive faces by comparing them to all front and back faces of all primitives in a product. The comparisons are performed independently at each pixel and involve depth tests, masks, counters, and logical bit operations performed at each pixel. This technique uses but two additional buffers. The algorithm has been implemented on a Pixel-Power graphic system having one processor with local memory at each pixel. This approach is described in the already mentioned journal article by J. Goldfeather et al. "Near Real-Time CSG Rendering using Tree Normalization and Geometric Pruning" in IEEE CG&A, vol. 9, no. 3, pp. 20-28, June 1989.

Other researchers, including certain of the present inventors, have developed a more efficient technique for processing products. This technique is referred to as a "trickle" algorithm and requires, in general, fewer primitive scan-conversion and buffer-merging operations than the technique of Goldfeather et al. As a result, this technique is believed to be better suited for implementation on emerging graphic workstations. The trickle algorithm is described in a Research Report entitled "Z-buffer Rendering from CSG: the Trickle Algorithm", RC 15182 (#67629) November 1989, IBM Research Division, by D. A. Epstein, F. W. Jansen and J. R. Rossignac.

Both the technique described by Goldfeather et. al. and the technique described by Epstein et al. process non-convex primitives by producing and trimming the successive layers of a primitive's hidden faces.

An important feature of the trickle algorithm is that it processes the primitive faces of a product in a front-to-back (away from the viewer) order independently at each pixel. This ordering permits the technique to stop the processing of a given product as soon as a visible point, or the background, has been reached at each pixel covered by the product's projection. Furthermore, while moving "deeper" (away from the viewer) from one primitive-face layer to another, the trickle algorithm advantageously skips primitive-face layers that clearly cannot lie on the product because they are out of at least one primitive in the product.

The trickle algorithm employs three depth and intensity buffers. These are the standard depth and intensity buffers used for visible surface selection, plus an additional depth-interval buffer composed to two depth buffers and two intensity buffers. It should be noted that the trickle algorithm may be configured to run in four passes, once for each quadrant of the screen. Splitting the screen into four quadrants provides sufficient buffers for the trickle algorithm, even with the standard configuration of one depth and two intensity buffers commonly available on graphic workstations.

It is thus an object of the invention to provide improvements and enhancements to the trickle algorithm to even further improve the processing of CSG-represented solids.

It is a further object of the invention to provide an efficient and accurate shadowing technique for CSG representations of solid objects.

Another object of the invention is to provide for an efficient method of determining visible front-faces of a product and for correctly handling situations where faces of several primitives overlap or where the ray of a pixel intersects two adjacent faces at a point near to a common edge, the method employing a small tolerance value to remove the effects of round-off error during scan-conversion.

A further object of the invention is to provide a method to terminate the scan conversion of a product's primitives at a time when further scan-conversions are determined to be unnecessary.

One still further object of the invention is to provide a method of improving the accuracy of rendering (i.e. scan conversion) of faces, the method employing a determination of an accurate depth value of a surface at the center of a pixel upon which the vertex subset of the surface projects.

SUMMARY OF THE INVENTION

The foregoing and other problems are overcome and the objects of the invention are realized by apparatus and method for rendering CSG expressions that are first decomposed into a sum-of-products form. Faces of each primitive are classified as either front-facing or back-facing and are scanned into a plurality of depth buffers (z-buffers). With each iteration of the method, front facing primitive faces are considered, and if not on the product, are replaced by other front-facing faces that lie behind them. The method terminates processing of each product when the visible face of each pixel is obtained. The visible front faces of each product are then merged into a final z-buffer by the use of a conventional hidden surface elimination technique.

By processing the primitive faces of a product for each pixel independently, the method avoids a boundary evaluation required for prior art techniques and determines for each pixel, through the use of relatively simple tests, a portion of a primitive's face that lies on the boundary of a product. The correct face for a pixel is considered to be the front face that is behind a front face and in front of a back face for every other positive primitive of the product and which furthermore holds opposite relations with respect to every negative primitive.

An additional benefit of the method is obtained in moving from the furthest-most front face of the product in that some primitive faces, which lie outside of other primitives in the product, may be skipped. The process terminates in a final pass when there is no change in any of the pixels upon which the product projects.

Furthermore, the method subtracts a tolerance value, eps, from the depth of the scanned face during a depth test and also during a bit merging operation into a final z-buffer. As a result, coincident faces are handled correctly and solids are regularized by eliminating dangling edges and cracks. The method also uses subpixel correction to accurately determine the z-depth at each pixel and employs a pixel-center test to determine if a face projects onto a given pixel.

In accordance with an embodiment of the invention there is disclosed apparatus and method for generating displayable information expressive of a three dimensional solid object. The apparatus includes a processor for expressing the object in a Constructive Solid Geometry representation thereof so as to be comprised of one or more primitive objects. The apparatus further includes a processor for repetitively evaluating the one or more primitive objects to determine displayable faces thereof. A depth interval buffer is responsive to the operation of a scan conversion processor for detecting when a predetermined number of repetitive evaluations occur without causing a change in the determination of a displayable face. The depth interval buffer generates a signal that causes the operation of the evaluation processor to terminate.

The apparatus and method employs toleranced depth tests to remove dangling faces or edges and to properly handle coincident faces. Pixel-centering is employed to improve the accuracy of depth tests and to identify pixels upon which a product projects.

The apparatus of the invention may also be provided with an auxiliary shadow depth buffer for storing a depth, referenced to a plane of a light source that illuminates the object, of a projection from a point on a face of the primitive object to the plane of the light source. Shadowing is accomplished using a two-pass scan-conversion technique in conjunction with the auxiliary shadow buffer.

BRIEF DESCRIPTION OF THE DRAWING

The above set forth and other features of the invention are made more apparent in the ensuing Detailed Description of the Invention when read in conjunction with the attached Drawing, wherein:

FIG. 1 depicts a prior art CSG binary tree for a solid comprised of three primitives;

FIG. 3 depicts the operation of the depth interval buffer of FIG. 1 in processing a primitive Q;

FIG. 7b is a flow chart showing the operation of the auxiliary shadow buffer of FIG. 7a;

FIGS. 8-11 depict the processing of two primitives in accordance with a plurality of examples of the operation of the system wherein FIG. 8 shows an intersection of two convex primitives; FIG. 9 shows an intersection of a non-convex primitive with a convex primitive, where both primitives share a common front face; FIG. 10 shows a difference between two convex primitives; and FIG. 11 shows the subtraction of one non-convex primitive from another non-convex primitive, each of the non-convex primitives having an internal crack.

DETAILED DESCRIPTION OF THE INVENTION

Figure 2:
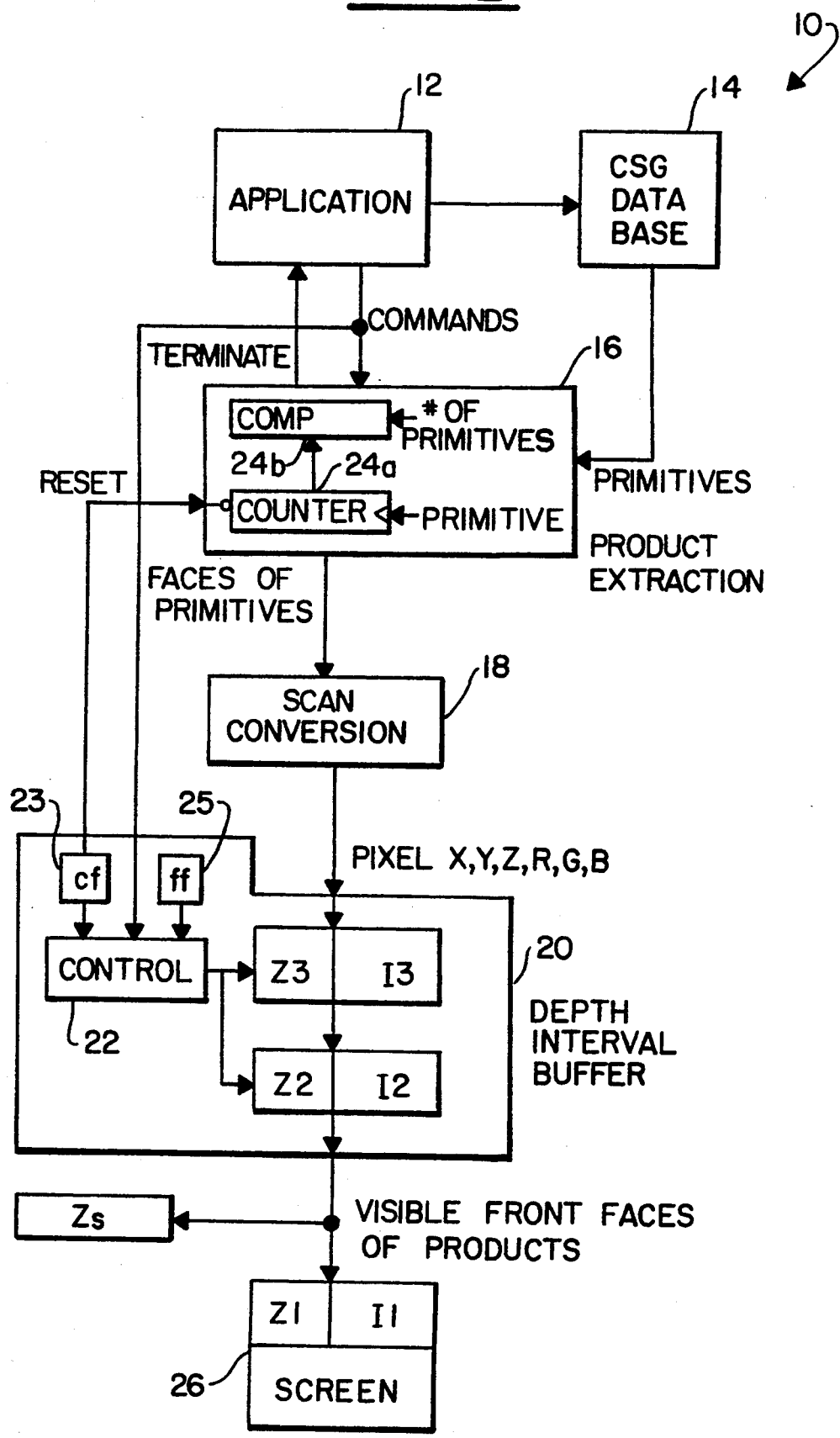
FIG. 2 is a block diagram showing an embodiment of an image display processing system constructed and operated in accordance with the invention.

Referring to FIG. 2 there is shown in block diagram form an embodiment of a CSG rendering and display pipeline system 10. An application processor 12, such as a CAD system, provides CSG data to a CSG storage or data base 14. This CSG data is expressive of a three dimensional solid being modelled. The application processor 12 also provides commands to a product extraction processor 16 that receives CSG primitives from the CSG storage 14 and produces faces of primitives therefrom. A counter 24a and comparator 24b are provided and generate a TERMINATE signal to the application processor 12. The operation of the counter 24a and comparator 24b in generating the TERMINATE signal is described in detail below. The primitive faces are provided to a scan conversion processor 18 that scan-converts the faces. In accordance with one aspect of the invention, the scan conversion processor 18 employs pixel-center considerations, as described below, during scan conversion operations. The output of the scan conversion processor 18 is x, y, z positional information for each screen pixel upon which the primitive face projects. Also output from the scan conversion processor 18 is pixel color information expressed as red (R), green (G) and blue (B). The output of the scan conversion processor 18 is provided to a Depth Interval Buffer processor (DIB) 20.

The DIB 20 includes a control block 22 that accepts commands from the application 12 to control the flow and processing of data within the DIB 20 in accordance with a pseudo-code representation described in detail below. The DIB 20 includes a plurality of z-buffers (Z3, Z2) and associated intensity buffers (I3, I2). Depth comparisions accomplished by the DIB 20 are toleranced, in accordance with another aspect of the invention, to compensate for computation-induced round-off errors that occur within the scan conversions processor 18. Also provided within the DIB 20 are a change flag (cf) 23 and a front-facing flag (ff) 25, as described below.

The output of the DIB 20 is data expressive of the visible, or displayable, front faces of the products, this data being provided to a third depth buffer (Z1) and a third intensity buffer (I1). I1 forms a pixel plane memory, the content of which is displayed upon a display screen 26. By example, Z1 is comprised of a number of 24 bit memory locations for expressing depth information for each screen pixel. I1 is comprised of a number of 24 bit memory locations, each of which is partitioned into three bytes for expressing the intensities of three colors (R, G, B). Thus, for each screen pixel there is a corresponding 24 bit Z1 memory location and a corresponding 24 bit I1 memory location. The buffers Z3, Z2, I3 and I2 are similarly organized.

The commands passed from the application 12 to the DIB 20 include commands that initialize the buffers, set up operations for scan conversion and perform operations between buffers. For example, a command such as INITBUFFER (1,MAX_DEPTH,BLACK) initializes buffer 1 with the maximum depth value for Z1 and the background color for I1. A typical buffer operation command has the format COPYBUFFER (3,2,TRUE,'-NE',0) which copies buffer 3 into buffer 2 whenever (ff) 25 is true and Z2 is not equal to Z3+eps, a tolerance value described below. This command corresponds to lines 26-30 of the pseudo-code representation described below. Commands that set up scan conversion operations include a command that sets the tolerance value to a specified value and a command such as SCAN_INTO(3), which sets buffer 3 as the recipient of scanned values in lines 23-34 of the pseudo-code representation described below. The TERMINATE condition may be tested by using the commands SET_CHANGE_FLAG (FALSE) to reset the (cf) flag 23, as in line 12 of the pseudo-code representation. After each primitive scan conversion a command such as IF GET_CHANGE_FLAG () THEN k=0 has the effect of resetting the counter 24a as in line 31 of the pseudo-code representation.

An example of commands directed to the product extraction block 16 include a command N=COUNT_PRODUCTS (CSGTREE) which counts the total number of products in the CSG tree, and a command RENDER_PRODUCT(k) which causes the product k to be processed by repeatedly scan converting its primitives into buffer 3 until the front of the product is constructed in buffer 2. The operation of these various commands will be made more apparent in the ensuing description.

At a high level the operation of the trickle algorithm may be expressed as the following pseudo-code segment.

initialize buffer 1 for each product P do:
   compute the front of P in buffer 2 merge the result into buffer 1 selecting the visible faces.

Buffer 1 (Z1 and I1) is used to select the visible surfaces of a union of products. The visible front faces of each product are computed one after the other using buffer 2, the DIB 20, as summarized below in a further pseudo-code segment.

initialize Z2 to the background while not done, circulate through the primitives Q of P and do:
   Compute into Z3 the next face of Q that lies behind Z2
   At pixels where the next face of Q is front-facing copy Z3 into Z2.

The trickle algorithm is especially effective in that, when a point in Z2 immediately precedes in depth a front face of a primitive Q, the point lies out of Q, and thus out of the product. Furthermore, the interval between the tested point and the corresponding front point on Q is also out of Q and is thus also out of the product.

As can be seen in FIG. 3, when moving forward along the z-axis in a direction away from a viewpoint, a point p is found to lie on a primitive Q in a current product and its depth is stored in Z2. The primitive Q is scan-converted and the depth of point q on Q is stored into Z3 because point q is the first point on Q (in terms of depth) to be hidden by p. Point q is a front point for Q. Therefore, the segment (p,q) is out of Q and thus out of the product. The trickle algorithm next stores the depth and intensity of p into Z2 and I2. It should be noted that point r, on a different primitive in the product, is skipped because it lies between p and q and thus is also not on the product.

A pseudo-code representation describing the operation of the various processors that comprise the system 10 is set forth below. A significant improvement over the previously described trickle algorithm is achieved by toleranced depth-tests that provide correct treatment for all singular cases, also referred to as "on-on" cases, involving coincident primitive faces and pixels in the vicinity of the projection of silhouette edges. Other significant improvements over the trickle algorithm will be made apparent during the ensuing description of the operation of the system 10.

Henceforth, all line number references that appear refer to the pseudo-code representation of the improved trickle algorithm presented immediately below.

initialized to −1 (line 9). Counter 24a is employed, in accordance with an aspect of the invention, to count the number of primitives of the current product that are processed without affecting Z2. When the value of counter 24a is incremented to equal the number of primitives in the product it is indicated that no change has occurred to the pixels representing the current front-face. The output of counter 24a is provided to a comparator 24b where the counter output is compared to a number of primitives in the product. When the content of counter 24a equals the number of primitives a TERMINATE signal is generated to the application 12 causing scan-conversion (the UNTIL loop of lines 10–31) to halt, thereby terminating subsequent exhaustive scan conversion of all primitives contained within the product. If there is only one primitive in the product, the single primitive is scanned only twice to properly produce the effect of regularization.

In a worst case, the method scan-converts each primitive of the product approximately as many times as there are "layers" in all primitives of that product. In that each layer may produce a tentative point for Z2, it

```
01:    FOREACH x IN pixels DO          ## initialize final buffer
02:       {Z1[x] = infinity;            ## back plane
03:       I1[x] = black;}               ## background color
04:    FOREACH P IN products DO
05:       {FOREACH x In pixels DO       ## initialize product buffer
06:          {Z2[x] = 0;                ## init buffer 2
07:          I2[x] = black:}
08:
09:       k = -1;
10:       UNTIL (k==NumberOfPrimitivesIn(P)) REPEAT
11:          {k++;                      ## count useless passes
12:          change=0;                  ## set if any pixel has changed
13:          Q=NextPrimitiveInTheCircularListOfPrimitivesIn(P);
14:          FOREACH x IN pixels DO     ## initialise Z3, I3, and ff
15:             {Z3[x] = infinity;
16:             I3[x]= black;
17:             IF IsPositive(Q) THEN ff[x]=1 ELSE ff[x]=0;
18:          FOREACH F IN faces(Q) DO
19:             {FOREACH x IN PixelsVisitedByScanconverting(Q) DO
20:                Z=DepthOfScanconvertedPointOn(F,x);
21:                I=IntensityReflectedByScanconvertedPointOn(F,x);
22:                IF (Z2[x] < Z-eps < Z3[x])
23:                   {Z3[x]= Z;
24:                   IF (IsFrontFacing(F)) I3[x]=I;}
25:                IF Z2[x]<Z-eps) ff[x]=!ff[x];
26:          FOREACH x IN pixels DO     ##move back if bad point
27:             {IF (ff[x] AND Z2[x] != Z3[x])
28:                {Z2[x] = Z3 [x];
29:                J2[x] = I3[x];
30:                change = TRUE;}}
31:          IF (change) k = 0;}
32:       FOREACH x IN pixels DO        ## merge into final z-buffer
33:          {IF (Z2[x] < Z1[x] + cps)
34:             {Z1[x] = Z2[x];
35:             I1[x] = I2[x];}}}
```

For the pseudo-code representation of the improved trickle algorithm presented above, an initialization for each pixel of depth buffer Z1 and intensity buffer I1 sets these two elements to a maximum depth and to a selected background color, respectively (lines 1–3). Next, for each product Z2 is initialized to a minimum depth and I2 is initialized to the background color. Next, the visible front faces of the product are computed and stored in the depth buffer Z2 and intensity buffer I2 (lines 9–31). Finally, the result is merged into Z1 (lines 33–35) wherever the current product's front face lies in front of previously processed products.

In greater detail, to compute the visible front faces of a product the method proceeds as follows. A counter k, corresponding to the counter 24a of FIG. 2, is first may be required to scan all but one primitive of the product to declare that a point in Z2 is out of the product. The concept of a layer, as employed herein, corresponds to disjoint segments obtained by intersecting a ray, parallel to the z-axis, with the primitive's volume.

However, for the typical case, the operation of the method stops the loop processing at an early stage. It is noted that k is initialized to −1 (line 9) to ensure proper processing of products having but a single primitive.

Within the loop, the change flag (cf) 23 is initialized at line 12 and updated at line 30 to determine if Z2 has been advanced and if counter 24a is reset to zero (line 31). If a change is indicated, counter 24a is reset and, as a result, does not generate the TERMINATE signal for that particular pass through the loop.

The inner loop (lines 13–31) is executed for primitives (Q) in the product, the list of primitives being processed in a consistent circular manner (line 13). First, Z3, I3 and the front-facing flag (ff) 25 are initialized (lines 14–17). There is one bit of storage associated with each pixel to hold that pixel's front-facing flag. The front-facing flag (ff) 25 is set to one if the current primitive is positive i.e., bounded. In this regard it is assumed that each primitive has a bounded boundary. Primitives with a bounded interior are called positive. Others are called negative. Also in this regard, if the leaves of the original CSG graph are bounded volumes, negative primitives correspond to those leaves that have been subtracted an odd number of times. The front-facing flag (ff) 25 is used to determine, at each pixel, whether the method should cause Z2 to be advanced (line 27).

Next, the method and apparatus of the invention scan-converts faces of the current primitive Q (lines 18–25). For each pixel covered by the projection of Q, Z3 and I3 are updated, where appropriate, with the depth and intensity of the scanned surface points (lines 22–24). The update occurs only if the scanned Z value lies between the depth stored in Z2 and that stored within Z3 (line 22).

In accordance with an aspect of the invention a relatively small tolerance value (eps), (small compared to the size of the model being processed) is subtracted before the depth test to ensure correct treatment of coincident faces. Also in this regard I3 is updated only if the scanned surface is front-facing. This ensures that intensities of back-facing faces are not stored within I3 should they overlap with front-facing faces near silhouette edges. This aspect of the invention is described in greater detail below.

The front-facing flag (ff) 25 is toggled for each face of Q that passes behind Z2 (line 25). Again, the eps value is used to ensure that scan conversion accuracy and round-off errors do not lead to incorrect results.

As employed herein, the front-facing flag (ff) 25 serves to indicate a parity of points that lie either within or without the primitive Q. By example, and referring to FIG. 4c, in moving away from the view plane in the z-direction a first point (P1) can be seen to have three faces of Q that lie behind the point. Thus, the point P1 is considered to have an odd parity and by definition is considered to lie within the primitive Q. Points P2 and P3 each have two faces of Q that lie along the z-direction and are thus considered to have an even parity. By definition, a point having an even parity is considered to lie outside the primitive Q. The test is accomplished by storing the point in a z-buffer, scan-converting the primitive and toggling the front-facing flag (ff) 25 for each face determined to lie behind the point. At the completion of scan conversion the state of the front-facing flag (ff) 25 indicates the parity of the point and, hence, whether the point is contained within the primitive.

In the previously mentioned trickle algorithm, face trimming, i.e. testing face points against a primitive Q in a product, is accomplished by testing whether the first face of Q that is encountered behind the tested point is front-facing or back-facing. However, near the edges of Q, or if Q appears flat within the resolution of the z-buffer, both front-facing and back-facing faces may have the same depth. To overcome this problem the method of the invention employs the parity of the number of faces behind the tested point (line 25), as suggested in the previously mentioned article by J. Goldfeather et al. "Near Real-Time CSG Rendering using Tree Normalization and Geometric Pruning" in IEEE CG&A, vol. 9, no. 3, pp. 20–28, May 1989. An even number of faces of Q behind a point implies that the point is outside of Q (for positive Q).

Finally, after the entire primitive Q has been scan-converted Z3 is copied into Z2 wherever the front-facing flag (ff) 25 is set (line 27–31), i.e., wherever the points stored in Z2 are out of Q. Thus, these points in Z2 are replaced by front-facing points on Q (if any) which have been stored in Z3.

The additional condition, Z2[x]!=Z3[x] (line 27), which requires that the depths stored in Z2 and in Z3 be different, is provided to ensure proper treatment of points outside of the projection of positive primitives. For these points ff=1, but Z2 and Z3 are both equal to the maximum depth.

Figure 4A:
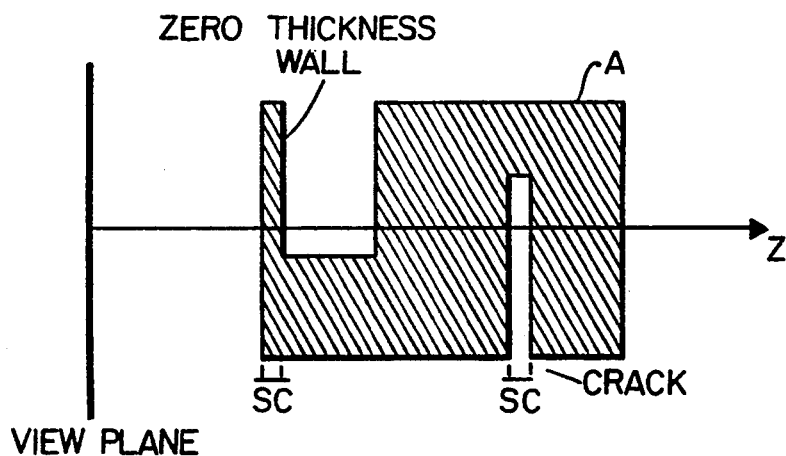
FIG. 4a depicts an effect of limited depth resolution wherein a constriction appears as a degenerated zero-thickness wall and wherein a narrow cavity appears as a crack.
Figure 4B:
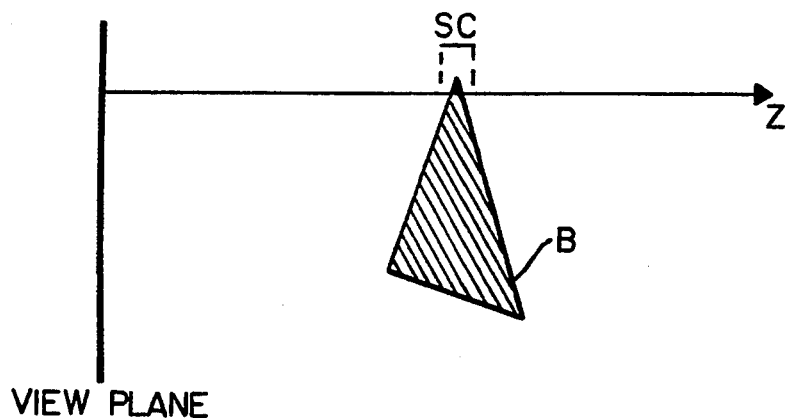
FIG. 4b depicts an effect of limited depth resolution near to where a silhouette back face and front face appear to coincide.
Figure 4C:
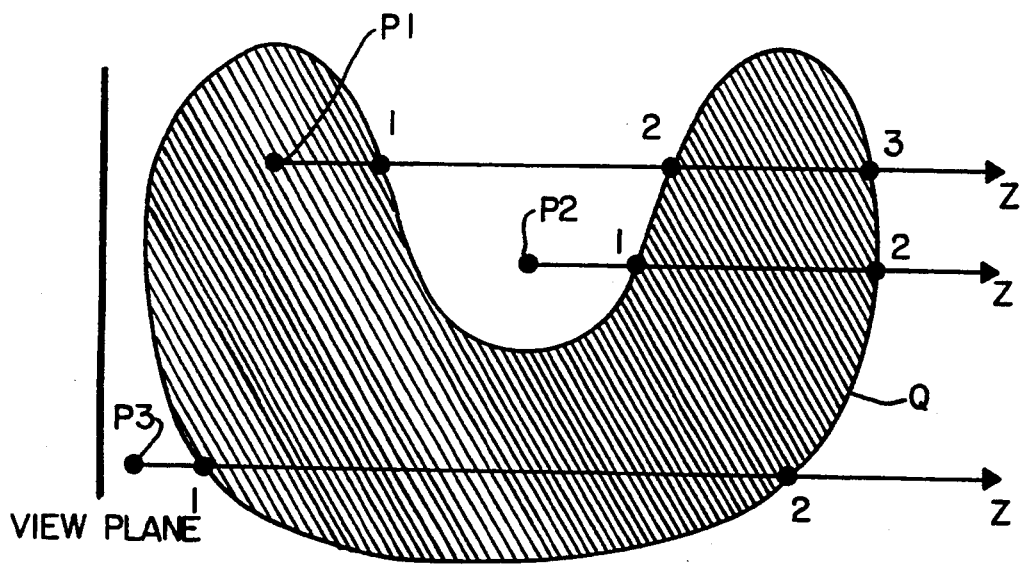
FIG. 4c depicts a determination of the classification of points lying in different relationships to a solid.

The before-mentioned singular conditions (on-on cases) occur where two different faces cover the same pixel and have the same or almost the same depth at points that project onto that pixel. Singular conditions (SC) are depicted in FIGS. 4a and 4b for the solids A and B, respectively. Such situations occur in a mathematical (exact) model when faces of several primitives overlap. In addition, they also occur in a discretized graphic model near edges that connect a front and a back face, as in FIG. 4b, or at constrictions such as thin walls, or in interior cracks, that have a depth that is less than the depth resolution of the z-buffer, as in FIG. 4a. A method for computing a correct image for all of these singular cases must be sufficiently robust to also compensate for depth-errors due to the inherent round-off errors of scan-conversion.

A compensation method is thus required so that if a layer of a primitive has a depth smaller than the depth resolution of the z-buffer, it is processed as if it were flat (zero depth).

Furthermore, even for a relatively large primitive layer, a situation may exist wherein the primitive appears locally flat. For example, when approaching a silhouette edge, as in FIG. 4b, the abutting two faces of the same primitive (one front-facing and one back-facing) are arbitrarily close to one other in depth. At the silhouette edge the front and back faces have the same depth. During scan-conversion a pixel located close to the edge's projection on the display 26 screen will be found, for both faces, to have the same integer-rounded depth-value. Thus, for that particular pixel, the primitive appears as a flat (zero-depth), degenerate solid. In that the method proceeds independently for all pixels, the method must correctly handle such degenerate primitives, otherwise the displayed solid may incorrectly exhibit cracks or dangling edges.

In accordance with an aspect of the invention the initialization (line 9) of the counter 24a to a value of −1 insures that products with a single primitive are scan-converted twice. This provides an opportunity for the method to produce a tentative point in Z2 during the first scan-conversion, and to then classify, if appropriate, the tentative point as being out of the primitive during the second scan-conversion.

Furthermore, the treatment of singularities, or "on-/on" cases, is known to involve a neighborhood evaluation, as reported by A. A. G. Requicha and H. B. Voelcker in "Boolean Operations in Solid Modeling: Boundary Evaluation and Merging Algorithms", Proceedings of the IEEE, vol. 73, no. 1, January 1985. In that the method of the invention tests the faces of primitives in a front-to-back manner, only the neighborhood behind the face is relevant. In this regard the neighborhood indicates whether there is material, with respect to the product, behind the face. If there is material in front of the face, the method terminates earlier for the pixel and does not reach the face in question. Therefore, it can be assumed that if material of the product exists behind the face, the face point is on the product and is the front-most point visible through the corresponding pixel.

As a result, a technique proposed in the article mentioned previously, "Depth buffering display techniques for constructive solid geometry", IEEE, Computer Graphics and Applications, vol. 6, no. 9, pp 29–39, September 1986 by J. R. Rossignac and A. A. G. Requicha, is preferably employed to test a point, positioned behind the scan-converted point, before comparing the scan-converted point to the depth stored in Z2 (line 22).

The use of the before-mentioned tolerance value (eps), employed for certain of the computations, is now described in greater detail.

It is first noted that the rotations that are conventionally employed to position primitives introduce round-off errors within the coefficient of their bounding planes or vertices. Consequently, if primitives are rotated to align some of the faces, the surfaces containing faces that should overlap will typically not coincide. Furthermore, scan-conversion round-off errors may result in unpredictable depth-ordering of any two theoretically coincident faces at any pixel. As a result, an ordering of faces based solely on depth comparisons does not provide consistent results across the entire overlap region of both faces.

Therefore, in all operations that address the problem of coincident faces, the apparatus and method of the invention employs the relatively small tolerance value (eps). The use of the tolerance value ensures that two depth values that are intended to be equal will be considered equal.

Of course, the selection of a value for eps that is too large may result in treating as equal two values which are not intended to be equal. In such cases the method would produce an image that corresponds to a regularization "modulo eps" of the solid. That is, the method would operate to remove portions of the model having a shallow z-depth while displaying the correct faces everywhere else.

Thus, the value for (eps) is selected so as to exceed the combined effect of limited z-buffer resolution and of the round-off errors induced during depth calculation during surface scan-conversion. If too large an eps value is used certain details, such as shallow features, may disappear in that front-facing and back-facing faces are considered coincident.

In order to employ a relatively small value for eps, while still correctly processing the above-mentioned coincident face "on/on" cases, a starting depth along each scan-line must be accurately determined. A method for accurately determining this depth is now discussed in detail.

It is first noted that, due to the integer representation capability of the z-buffer Z1, conventional scan-conversion procedures, which compute surface points for all pixels covered by a face, produce approximate, or truncated, depth values. Consequently, the depth of a point that lies on an overlapping portion of two coplanar faces may differ depending on which face is scan-converted to produce the point.

To overcome this deficiency, and to ensure that intended coincidences are correctly treated, the method considers that two points that project onto the same pixel are identical if their respective depths along the z-axis differ by less than eps. The value of eps is determined from the size of the scene and by the z-buffer resolution.

Figure 5:
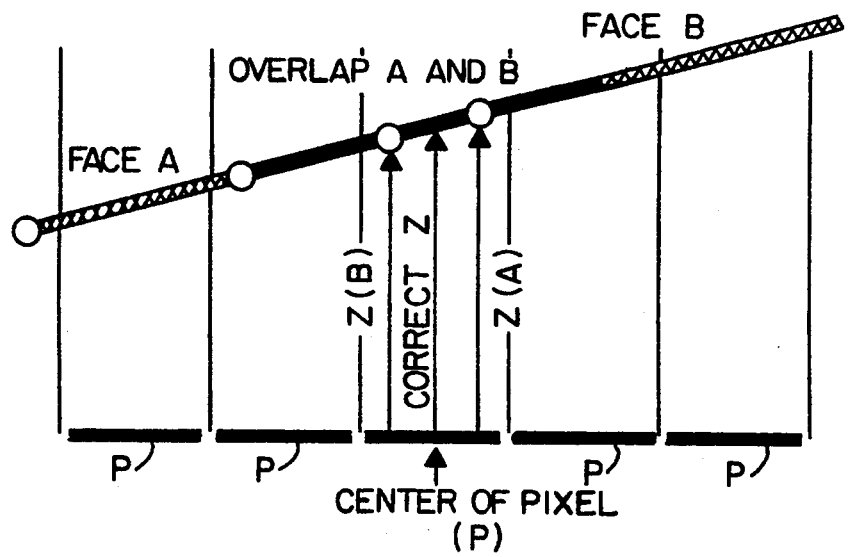
FIG. 5 shows a technique for achieving an exact scan-conversion that employs adjusting a starting depth of a scan line to produce exact z-values for a surface.

Referring to FIG. 5, if a face of a primitive is at a steep angle relative to the z-axis, the sampled depth value may vary widely over the width of a pixel (P). As a result, to correctly treat coincident faces, such as the faces A and B, it is important that every face be sampled at exactly the same point within the pixel. As employed by the method this point is chosen to be the geometric center of the pixel, wherein a pixel is generally considered to be a planar square surface area. If two faces are coincident, the sampling of depth values for those pixels covered by both faces therefore yields the same depth for both faces at each covered pixel.

The method operates to determine the depth for the starting pixel of each horizontal span, not by simply using a z-increment along the leading edge of the pixel as is done for some conventional scanning algorithms, but by determining the surface point that projects onto the center of the starting pixel. Consequently, within the numerical accuracy of the computation of a z-increment and the use of the z-increment along a scan-line to determine the depths of subsequent points along the scan-line, the depth for all covered pixels is correct with respect to the scanned surface, and will thus be the same for all faces lying in that surface.

This aspect of the invention may be accomplished by employing a floating-point calculation to obtain an accurate horizontal offset distance from the projection of the first point to the pixel center, this offset distance thereafter being applied when determining the z-depths of other points along the scan-line of the face. Alternatively, the pixel area may be partitioned into a number of regions with each region being assigned an offset value relative to the pixel center. The offset values are subsequently stored within a look-up table for deriving the correct offset value as a function of where within the pixel area the first point projects.

Figure 6:
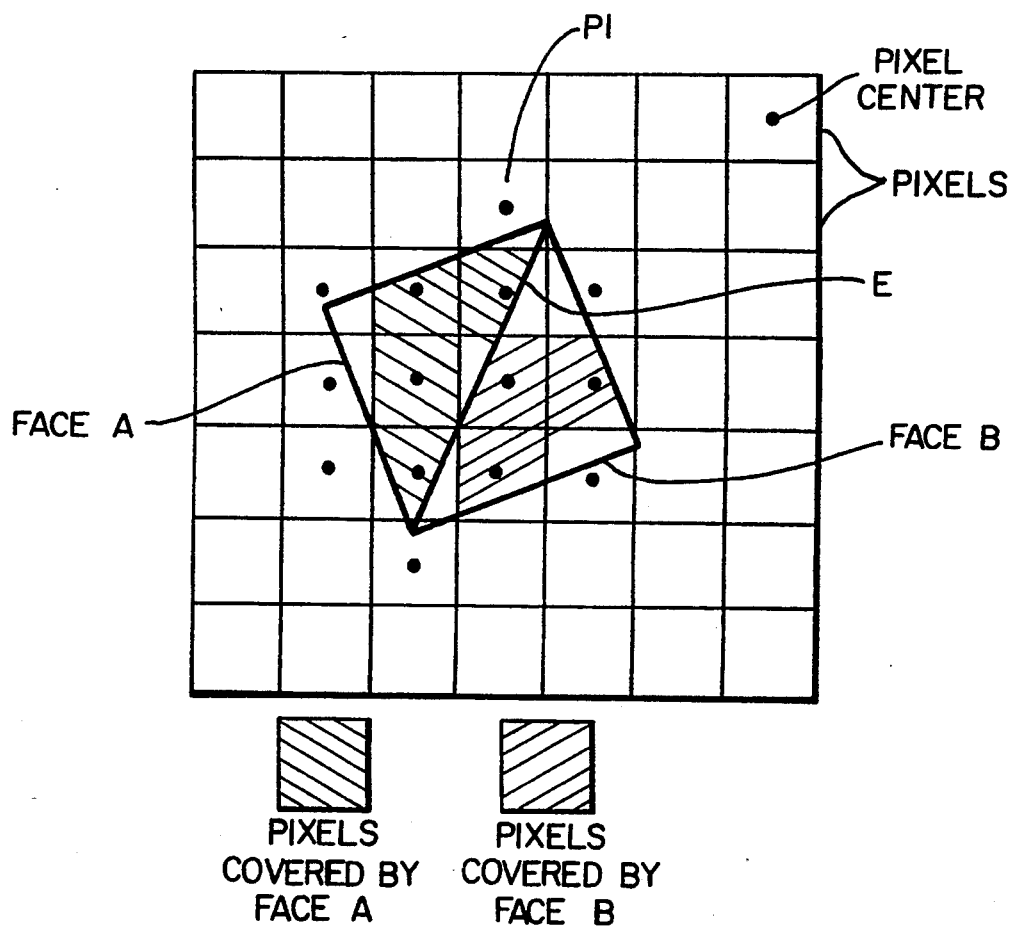
FIG. 6 depicts a technique for achieving an adjusted scan-conversion of a primitive having two faces projecting on a plurality of pixels.

Another aspect of the invention relates to providing consistent scan-conversion at a boundary between two primitive faces. Referring to FIG. 6 there are illustrated a plurality of pixels having two faces (A and B) of a primitive projected thereon. A boundary or edge between the two faces is indicated as E. The trickle algorithm referred to above requires that every pixel covered by the projection of a primitive be covered by a number of front faces that equals the number of back faces of that primitive. This requirement indicates that primitives' boundaries should be valid two-cycles with no interior or dangling faces. This condition is implied in the regularization of solids which is an assumption of CSG. However, scan-conversion procedures dealing with two adjacent faces of the same primitive do not automatically ensure such parity. For example, conventional Bresenham or anti-aliasing algorithms do not.

A simple interpolation of the depth value over a span, or horizontal row of pixels covered by the face projection, may lead to a wrong calculation of the depth at the end of the span if the end of the span only partially covers the associated pixels. This is because the depth is extrapolated using the slope of the plane containing the face, even though the pixel's center is not covered by the face.

By example, there is considered first the pixel (P1) whose rectangular region is traversed by the projection of an edge between a front-face and a back-face, but whose center is not covered by these faces. If the scan-conversion algorithm visits P1 for these two faces, a depth value will be computed for the center of the pixel. However, despite the magnitude of depth resolution of the z-buffer or the magnitude of the (eps) tolerance value, a slope for the two faces can be chosen such that, at the pixel P1's center, a computed depth for the front face will exceed a computed depth of the back face. This "overshoot" condition may result in an incorrect display near silhouette edges of primitives.

In accordance with this aspect of the invention the solution to this problem involves processing, during scan-conversion, only those pixels whose centers are covered by a particular face. For the example of FIG. 6 only those cross-hatched pixels associated with face A are scan-converted for face A in that it is only upon these pixels that the projection of face A covers the pixel center. The same situation exists for the cross-hatched pixels whose centers are covered by face B. As such, the scan-conversion processor 18 does not consider the pixel P1 and the overshoot problem referred to above is overcome.

Figure 7A:
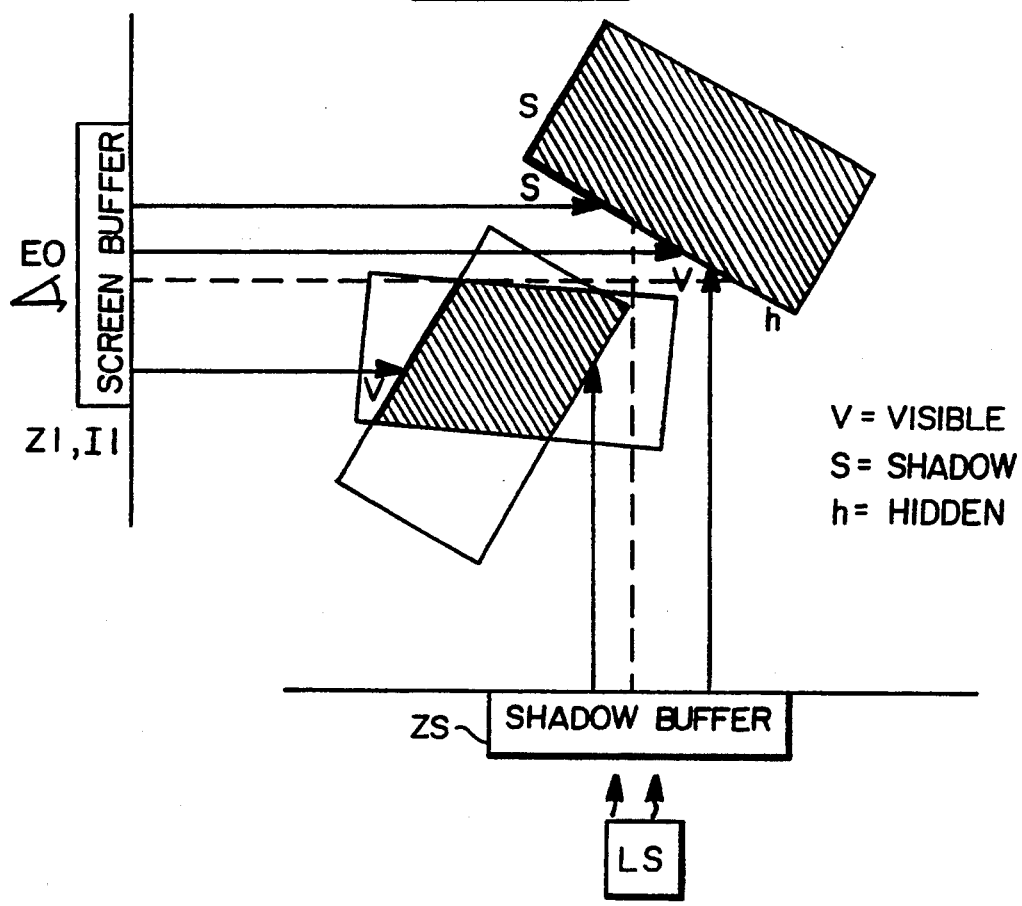
FIG. 7a depicts an auxiliary shadow buffer employed in a two-pass shadowing technique.
Figure 7B:
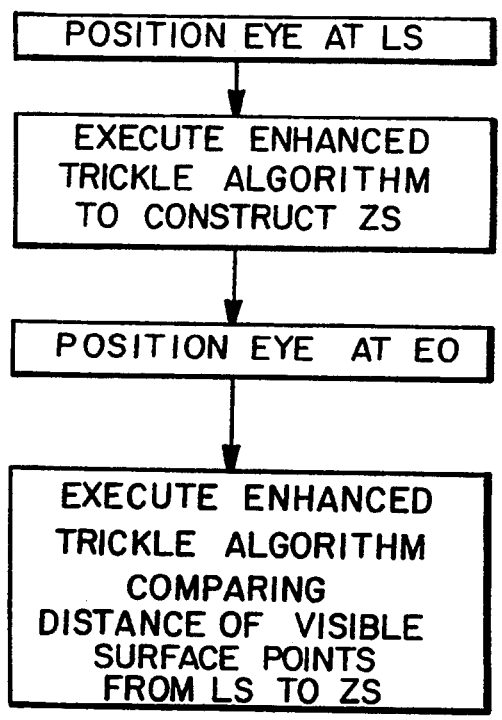

Referring now to FIG. 7a and the flow chart of FIG. 7b there is illustrated a further aspect of the invention that concerns shadowing of the displayed solid. In accordance with the invention, shadowing is accomplished through the use of an auxiliary "shadow" z-buffer (ZS) that selects surface portions visible from a light source (LS). ZS is constructed by executing the above-mentioned trickle algorithm, without computing any intensity information, in a coordinate system that first positions the eye at LS. Next, the trickle algorithm is executed once again from the normal eye orientation (EO) except that, while computing the intensity reflected by visible points, their distance to LS is compared to the distance stored in ZS. This establishes those surface points that are visible from LS. That is, if the visible surface points are lighted or are in the shadow of some other surface closer to LS.

This technique requires that during the final scan-conversion, after ZS has been computed, that the coordinates of surface points be expressed in both coordinate systems, specifically the coordinate system aligned with EO and the coordinate system aligned with the LS. To ensure that all pixels covered by the scan-converted surface are correctly processed, the scan-conversion uses increments in the EO coordinate system. These increments may be mapped into increments in the LS coordinate system through a constant matrix so as to increase the speed of the scan-conversion process.

An aliasing effect that occurs in ZS may be significantly accentuated if the surface upon which the shadow is projected is orthogonal to the EO viewing direction and nearly parallel to LS. However, such undesirable visual artifacts may be attenuated through the use of conventional techniques, such as those discussed by C. Woodward in a dissertation entitled "Methods for computer-aided design of free-form objects", Mathematics and Computer Science Series, no. 56, Helsinki University of Technology, Finland, 1990.

Several examples of the operation of the system 10 are now presented. These examples concentrate only on the computation of the visible front faces of simple products in that the sum (or union) of products may be performed by a conventional z-buffering hidden surface removal approach.

Figure 8:
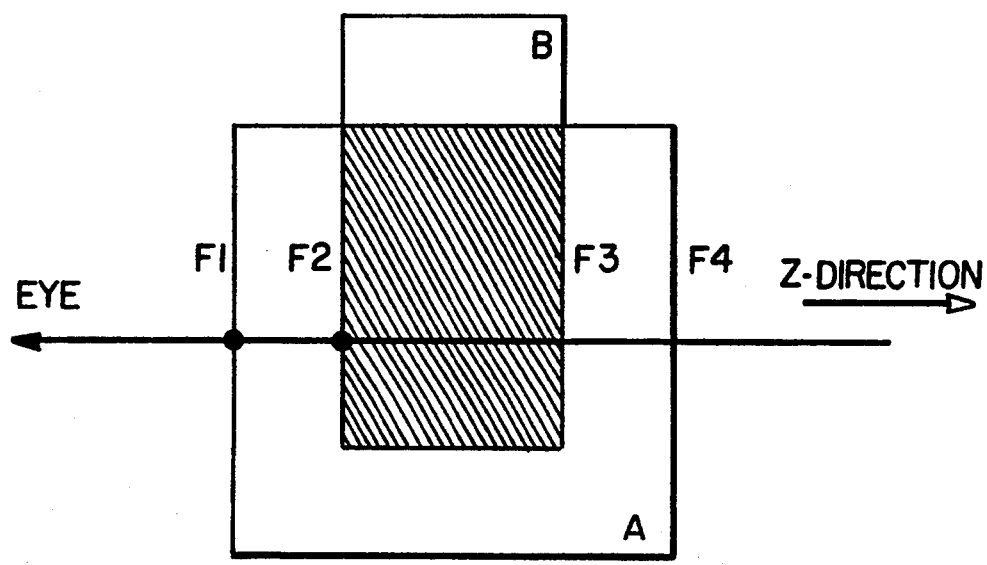

Reference is first made to FIG. 8 which shows two convex primitives, A and B. The product is the intersection of A and B. Primitive A has a front face F1 and a back face F4. Primitive B has a front face F2 and a back face F3. The other faces of A and B do not project onto the pixels of interest in this example and are thus not considered. The viewpoint is on the left and the z-axis direction is therefore horizontal and left-to-right. Considered is a particular pixel symbolized by the horizontal line through the viewpoint. The face of the product that is visible through the pixel is the front face F2 of B.

The operation of system 10 proceeds as follows. Before scan-conversion is begun, a pixel buffer memory is initialized. Z2 is initialized (line 6) to zero in that, for simplicity, it is assumed that the world lies on the positive side of the Z=O plane. I2 is also initialized to the background color (line 7). The count k (counter 24a) of redundant scan-conversion passes is initialized to −1.

Primitive A appears first in the circular list of primitives in the product and is thus scan-converted first. Since A is positive, and thus bounded, the parity bit flag "(ff) 25" for each pixel is initialized to 1. As a result, points stored at pixels not covered by the projection of A are properly treated as being exterior to A. Z3 is initialized to "infinity", that is to a value representing the maximum depth of the z-buffer, and I3 is set to the background color (lines 15–17).

During the scan-conversion of the faces of A it is found that, at least for the pixels consider here, the following relationship exists: $Z2 < F1 < F4 < Z3$. The test at line 22 succeeds, for an appropriately small value of eps, and the depth of F1 is stored in Z3 and the color of F1 is stored in I3. That is, the front face of A is stored in Z3. Both F1 and F4 are behind Z2, causing the parity flag ff is toggled twice during the scan-conversion of A and to therefore have a value of one when scan-conversion of A terminates. It is noted that the tested point in Z2 is outside of A and should be replaced by points further back.

It is also noted that, during scan-conversion, the enhanced trickle algorithm features are employed, including pixel-center considerations and the use of the toleranced (eps) depth tests, as previously described in detail.

During the update steps (lines 26–30), the contents of Z3 and I3, now corresponding to face F1, are copied into Z2 and I2. The count k of redundant passes is reset to 0, since some pixels have been updated. It is noted that pixels outside of the projection of A now contain, in Z2, the background depth and color.

Next, primitive B is scan-converted. Primitive B has faces F2 and F3. The value of k (counter 24a) is increased to 1, the front-facing flag (ff) 25 is set to 1, and Z3 is initialized to "infinity". It is found that $Z2 < F2 < F3 < Z3$, causing the depth and intensity of F2 to be copied into Z3 and I3. Once more Z2 is less than F2 and F3, resulting in the parity flag being toggled twice. This occurs because the tested point in Z2 is out of B. The contents of Z2 and I2 are overwritten with data from face F2 and the counter 24a is reset once more to zero due to action of the change flag (cf) 23.

The next primitive must now be considered. First, k is increased to one and (ff) 25 is set to one at each pixel. Due to the circular nature of the primitive list, primitive A in scan-converted again and it is found that F1<Z-

$2 < F4 < Z3$. Face F1 is thus not considered, because it does not lie behind Z2. The depth of F4 is stored in Z3, but since F4 is back-facing, the color of F4 is not copied into I3. In that only one face of A, F4, is behind Z2 the parity flag is toggled only once and thus has a value of zero. Consequently, Z2 is not changed and the counter 24a is not reset and retains the value of one.

Primitive B is scan-converted once again. The value of k is incremented to two and the parity flag is set to one. Z2 already contains the depth of F2 and after scan-converting B it is found that: $Z2 < F3 < Z3$. The depth of F3 is therefore copied into Z3, but the color is not copied into I3 because F3 is back-facing. Only F3 is behind Z2 so the parity flag is toggled to zero at each pixel covered by the projection of F3. Z2 is therefore not changed, (cf) 23 does not cause counter 24a to be reset, and the count held by counter 24a remains at two. Z2 retains the front face, F2, of B.

In that the value of k (counter 24a) now equals the number of primitives in the product, the TERMINATE signal is generated by comparator 24b and the scan conversion loop is terminated (line 10) with the product's visible front face (F2) in Z2. The contents of Z2 and I2 are copied into the display buffers Z1 and I1, wherever Z2 is less than Z1, so as to merge this product with other products of the disjunctive form.

Figure 9:
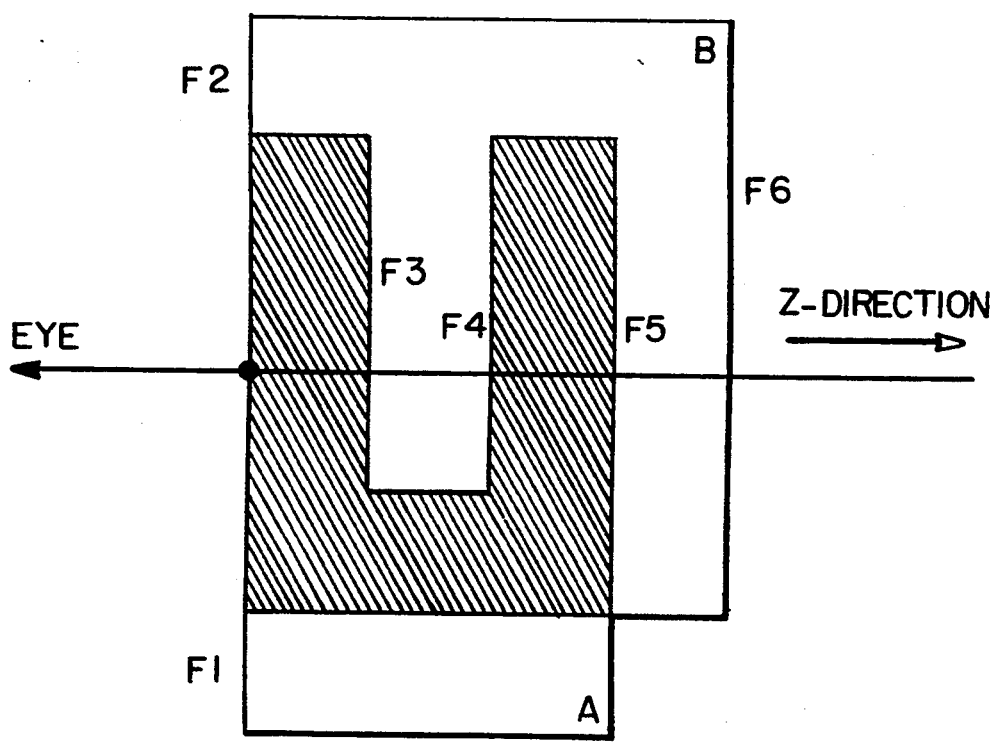

Referring now to FIG. 9 there is illustrated a further example of the operation of the system 10 for the intersection of a non-convex primitive A with a convex primitive B. Primitive A has faces F1, F3, F4 and F5 and B has faces F2 and F6. The front faces F1 and F2 are coincident.

As before, Z2 is initialized before scan converting the primitive A. As in the previous example, the parity flag is set because A is positive. Because $Z2 < F1 < F3 < F4 < F5$, the face F1 is stored in Z3. Since there are four faces of primitive A behind Z2, ff is set to one and F1 is copied into Z2 and I2 (lines 26–30).

During the scan-conversion of B the face F2 is found to be coincident with F1, and $F2 < Z2 + eps < F6$. With only one face of primitive B behind Z2, the parity flag is toggled to zero and Z2 remains unchanged. The counter 24a is incremented to one.

Primitive A is scanned once more and it is found that $Z2 < F3 < F4 < F5$. The depth of F3 is stored in Z3, but I3 is not changed because F3 is back-facing. With an odd number of faces of primitive A behind Z2, the parity flag is toggled to zero and Z2 remains unchanged. The counter 24a is incremented to two, a value that equals a number of primitives in the product, and the TERMINATE signal is generated to stop the scan-conversion loop processing. Z2 contains F1, which is the front of the product. Z2 is subsequently merged into Z1.

Figure 10:
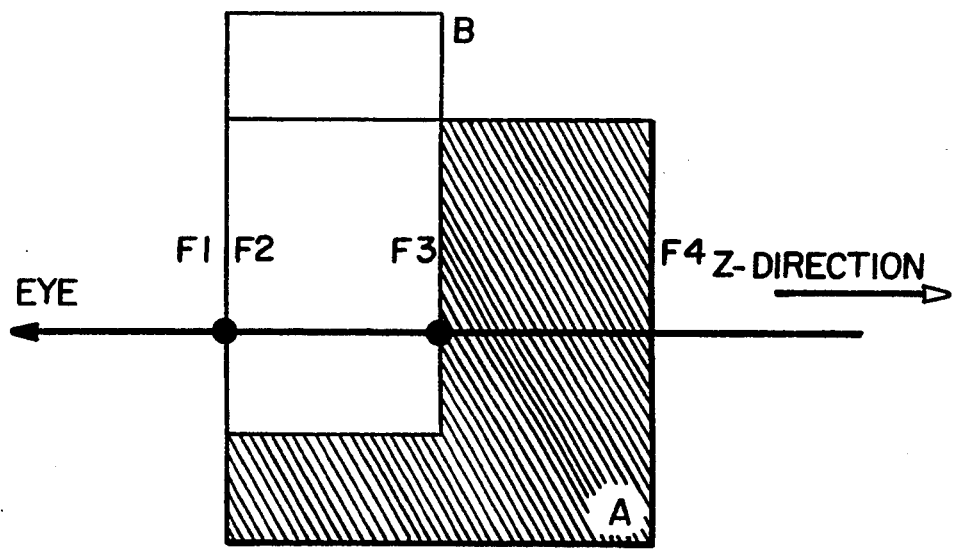

A further example is depicted in FIG. 10 for the subtraction of simple primitives A and B. In the product A−B the front face F1 of A coincides with the front face F2 of B. It is noted that because B is negative in the product, F2 is treated as a back face due to the intersection of A with the complement of B. The visible face of the product is F3, the original back face of the non-complemented primitive B.

Initialization occurs as before and primitive A is scan-converted with F1 being stored in Z2.

Next, primitive B is scan-converted. Because B is negative, the parity flag ff is initialized to zero. It is found that $F2 < Z2 + eps < F3 < Z3$. Therefore, F3 is stored in Z3, including the intensity in I3, because F3 is front-facing due to primitive B being negative. With one face of B behind Z2, ff is toggled to one at those pixels visited by the scan-conversion. F2 is outside of B and Z3 is copied into Z2.

Primitive A is scan-converted once more and the parity flag is set to one. Only F4 is behind Z2, therefore, the (ff) 25 is toggled once and set to zero. Consequently, Z2 remains unchanged. The same occurs during the second scan of primitive B. In that the value contained within counter 24a reaches the number of primitives, two in this case, without being reset the TERMINATE signal is generated and the scan-conversion loop is exited. Z2, containing F3, is then merged into Z1.

Figure 11:
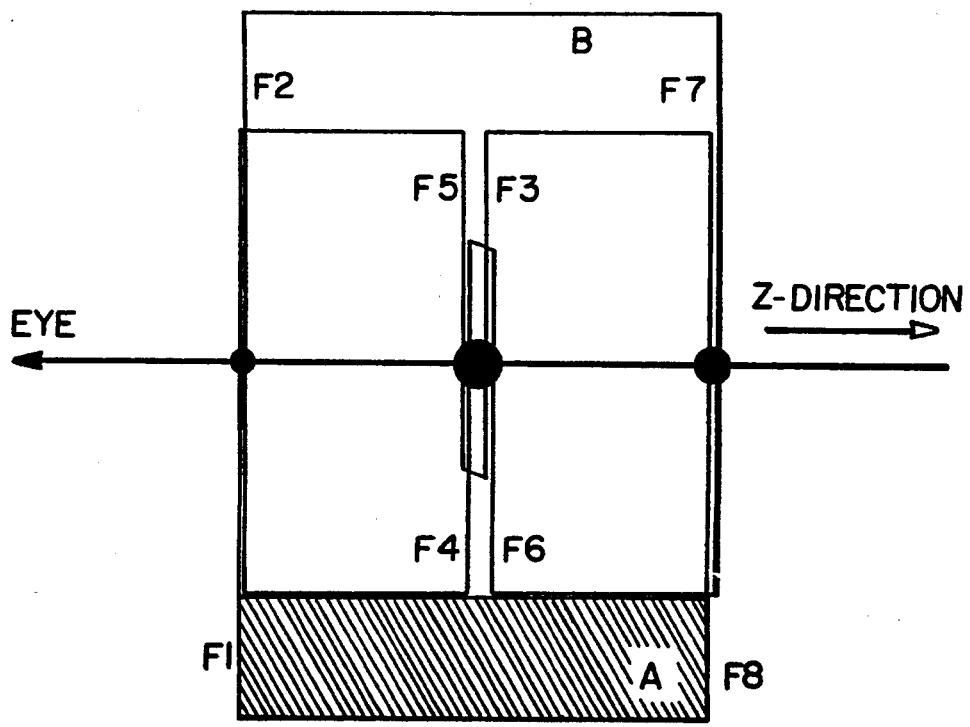

Referring to FIG. 11 a final example is given for primitives containing internal cracks. Primitive A has faces F1, F4, F5, and F7 while primitive B has faces F2, F3, F6, and F8. The non-regularized difference A−B that projects onto the pixel under consideration is the empty set. This example involves a subtraction of the non-convex primitive B, having an internal crack, from another non-convex primitive A, which also has an internal crack. The internal crack in primitive B is furthermore coincident with the internal crack in primitive A. Such cracks are produced when, within the model or because of limited depth resolution, two faces of the same primitive are coincident. These singularities may also appear close to silhouette edges, as discussed earlier.

After initialization and the scan-conversion of primitive A, as in the previous examples, F1 is stored in Z2.

Primitive B is scan converted and the parity flag is set to zero since B is negative. F2 is coincident with F1, so $F2 < Z2 + eps < F3 = F6 < F8 < Z3$. The depth of either F3 or F6 is copied into Z3, depending on the order in which the faces of primitive B are scan-converted. However, the intensity of F3 is saved in I3, because F6 is back-facing. In that there are three faces of B behind Z2, the (ff) 25 is toggled to one and Z3 is copied into Z2.

Primitive A is scan-converted again and the parity flag is set. F4 is coincident with F5 and with Z2 and the following condition is found to exist: $F1 < F4 < = F5 < Z2 + eps < F7 < Z3$. F7 is written into Z3. Since only F7 is behind Z2, the (ff) 25 is reset to zero, Z2 remains unchanged and therefore still contains F3.

Primitive B is scan-converted again and F6 and F3 are found to be coincident with Z2, resulting in: $F2 < F3 = F6 < Z2 + eps < F8 < Z3$. F8 is written into Z3. In that only one face of primitive B (F5) is behind Z2, the parity flag is toggled once to a one and F8 is copied into Z2.

Primitive A is once more scan-converted and the back-most face F7 of A is found to be coincident with F8, resulting in: $F1 < F4 = F5 < F7 < Z2 + eps < Z3$. There is no face of A behind Z2. Therefore, nothing is copied into Z3 and the parity flag remains set. Thus, the background color and maximum depth (infinity) with which Z3 was initialized are copied into Z2.

A further scan-conversion pass of primitive B causes no change and the process is terminated when the counter 24a reaches a count of two, corresponding to the number of primitives.

In summary, it has been shown that, to properly display regularized CSG solids using a multiple depth buffer technique, singular cases, where two faces have the same depth at some pixel, must be properly considered. Such coincident-face situations arise not only when CSG primitives are positioned having two dimensional contacts along their boundaries. The coincident-face situations also occur inadvertently when surface points on constrictions or on sharp corners near silhouette edges project onto the same pixel and have depth-values that are sufficiently close to one another to be rounded by the scan-conversion process to a same integer depth value.

This problem is overcome through the use of a tolerance value (eps) to remove the effects of round-off errors during scan-conversion. Thus, faces that are intended to coincide will coincide, even though the actual depth may differ at some pixels. Also, to produce a displayed image that is correct with respect to the regularized interpretation of the CSG expression, toleranced depth tests are used to remove dangling faces or edges that would otherwise appear.

Furthermore, in order to maintain a small value of eps, relative to the size of the model, to avoid a loss of small features, an improved scan-conversion technique is provided. This improved technique considers projections onto pixel centers to produce actual surface depths for all visited pixels. In this manner, if two faces that overlap in space are scan-converted independently, the pairs of values generated for all pixels covered by both faces are equal, except for a very small round-off error that may occur during depth increment accumulation.

Also, to ensure that scan-conversion may be used accurately for point-in-primitive classification, the scan-conversion technique is modified to guarantee that only pixels whose centers are covered by a face are visited during that face's scan-conversion.

Further in accordance with the invention, shadowing is accomplished using a simple two-pass scan-conversion technique with an auxiliary shadow-buffer (ZS).

Although described in relation to a specific embodiment it should be realized that modifications may be made without departing from the scope and spirit of the invention.

For example, a modified DIB 20 architecture may be used where the intensity buffers I2 and I3 are not provided. The method proceeds as described above to repetitively evaluate the primitive objects, except that intensity calculations and updates are not performed. The result is the computation of Z1 for the entire CSG expression, but without intensity information. An intensity determination pass is then executed which performs a one-time scan conversion of the front-facing faces of all the primitives. The intensity determination pass stores the corresponding intensity values in the pixel memory I1 for pixels where the depth stored in Z1 equals the surface depth at a currently processed point. This variation of the invention provides a significant savings of pixel memory, but may result in a small loss of image quality.

Thus, while the invention has been particularly shown and described with respect to a preferred embodiment thereof, it will be understood by those skilled in the art that changes in form and details may be made therein without departing from the scope and spirit of the invention.

Having thus described our invention, what we claim as new, and desire to secure by Letters Patent is:

1. Apparatus for generating displayable information that is expressive of a three dimensional solid, comprising:

means for expressing the solid in a Constructive Solid Geometry representation thereof so as to be comprised of one or more primitive objects, said one or more primitive objects each being comprised of a plurality of faces;

means for repetitively evaluating a sequence of one or more primitive objects to determine a correct image of a product of the primitive objects; and means, responsive to the operation of the evaluating means, for detecting a condition wherein a plurality of consecutive evaluations occur without causing a change in a tentative image of the product, the detecting means including means for counting consecutive evaluations that result in no change in the tentative image of the product and for generating a signal for causing an operation of the evaluating means to terminate when a number of consecutive evaluations occur that are sufficient to construct the correct image of the product, wherein the number is less than the square of the number of primitive objects in the product.

2. Apparatus as set forth in claim 1 wherein the evaluating means includes a plurality of depth buffer means and further includes means for comparing a depth, relative to a reference plane, of a point on a face of the primitive object being evaluated to a depth of a first point stored within a first depth buffer means (Z3) and also to a depth of a second point stored within a second depth buffer means (Z2), wherein the depths of the first point and the second point are determined during a prior evaluation of the same or of another primitive object.

3. Apparatus as set forth in claim 2 wherein the evaluating means includes means, responsive to the operation of the comparing means, for replacing the depth stored within Z3 by the depth of the current point (Z) when $Z2 < Z < Z3$.

4. Apparatus as set forth in claim 2 wherein the evaluating means includes means, responsive to the operation of the comparing means, for replacing the depth stored within Z3 with the depth of the current point (Z) when $Z2 < Z < Z3$ and further including means, responsive to the operation of the replacing means, for resetting the counting means to a value that is less than the number of primitive objects.

5. Apparatus as set forth in claim 2 wherein the evaluating means includes means, responsive to the operation of the comparing means, for replacing the depth stored within Z3 with the depth of the current point (Z) when $Z2 + eps < Z < Z3 + eps$, wherein eps is a tolerance value.

6. Apparatus as set forth in claim 2 wherein the evaluating means includes means, responsive to the operation of the comparing means, for replacing the depth stored within Z3 with the depth of the current point (Z) when $Z2 < Z < Z3$, and wherein the evaluating means further includes means for recording, for a line projected from the reference plane through the current point, a number of faces, of the primitive object being evaluated, that are intersected by the line.

7. Apparatus as set forth in claim 6 and further comprising second means for replacing the depth stored within Z2 with the depth stored within Z3 only when the evaluating means indicates that the current point lies on or within the primitive object being evaluated.

8. Apparatus as set forth in claim 7 wherein Z3 has an associated intensity buffer I3, wherein Z2 has an associated intensity buffer I2, and wherein the second replacing means also replaces the intensity stored within I2 with the intensity stored within I3 only when the current point lies on a front face of the primitive object.

9. Apparatus as set forth in claim 7 and further comprising a third depth buffer means (Z1), and also comprising third means, responsive to the generation of the signal, for replacing the depth stored within Z1 with the depth stored within Z2 only where Z2<Z1.

10. Apparatus as set forth in claim 2 wherein the the evaluating means includes means for projecting from points on a face of the primitive object to the reference plane, the reference plane being partitioned into a plurality of pixels, the evaluating means further including means, responsive to the operation of the projecting means, for determining a location of a pixel or pixels covered by the projection of the face and for selecting only those pixels having a center that lies within the projection from points on the face of the primitive object.

11. Apparatus as set forth in claim 2 wherein the reference plane is partitioned into a plurality of pixels and wherein the evaluating means includes means for projecting from a point on a face of the primitive object to the reference plane to determine a depth of the point from a pixel, and wherein the depth is referenced to a center of the pixel.

12. Apparatus as set forth in claim 2 and further comprising shadow depth buffer means (ZS) for storing a depth, referenced to a plane of a light source that illuminates the solid, of a projection from a point on a face of the primitive object to the plane of the light source.

13. Apparatus as set forth in claim 12 and further comprising means for comparing a depth of a point, referenced to the reference plane, to the depth stored within ZS for determining if the point is visible from the light source.

14. Apparatus for generating displayable information that is expressive of a three dimensional solid, comprising:

means for expressing the solid in a Constructive Solid Geometry representation thereof so as to be comprised of one or more primitive objects; and means for repetitively evaluating a sequence of one or more primitive objects to determine a correct image of a product of the primitive objects; wherein the evaluating means includes means for projecting from points on a face of the primitive object to a reference plane, the reference plane being partitioned into a plurality of pixels, the evaluating means further including means, responsive to the operation of the projecting means, for determining a location of a pixel or pixels covered by the projection of the face and for selecting only those pixels having a consistent point, independent of an inclination of the face with respect to the reference plane, that lie within the projection from the points on the face of the primitive object, the evaluating means further including means for determining a reference depth to an initially evaluated pixel that is covered by the projection of the face, the reference depth being determined from the consistent point of the initially evaluated pixel to a point on the face that projects onto the initially evaluated pixel, and wherein the reference depth is subsequently employed by the evaluating means in determining a depth to points on the face that project onto other pixels.

15. Apparatus for generating displayable information that is expressive of a three dimensional solid, comprising:

means for expressing the solid in a Constructive Solid Geometry representation thereof so as to be comprised of one or more primitive objects; and means for evaluating the one or more primitive objects to determine displayable faces thereof; wherein the evaluating means includes means for comparing a depth, relative to a reference plane, of a point on a face of the primitive object being evaluated to a depth of a first point stored within a first depth buffer means and also to a depth of a second point stored within a second depth buffer means, and wherein the comparing means makes the depth comparison using a predetermined depth tolerance value, the predetermined depth tolerance value being selected to compensate for computation-induced round-off errors that occur at least during the determination of the displayable faces and to compensate for a resolution of the first and the second depth buffer means, said predetermined depth tolerance value enabling a correct interpretation, consistent with a definition of a solid, that eliminates dangling faces and edges.

16. Apparatus for generating displayable information that is expressive of a three dimensional solid, comprising:

means for expressing the solid in a Constructive Solid Geometry representation thereof so as to be comprised of one or more primitive objects; and means for evaluating the one or more primitive objects to determine displayable faces thereof; wherein the evaluating means includes first means for repetitively comparing depths of points, that lie on faces of primitive objects being evaluated, to previously determined depths and for storing depths, within a depth buffer means (Z1), of each point determined to lie on displayable faces of the primitive objects, the depth being relative to a reference plane, wherein the evaluating means includes second means, responsive to a termination of operation of the first means, for comparing points on front-facing faces of the primitive objects and for storing within an intensity buffer means (I1) intensities of points on the front-facing surfaces that have a depth determined to be equal to a corresponding depth stored within Z1; and wherein, the first and the second comparing means each make depth comparisons using a predetermined depth tolerance value, the predetermined depth tolerance value being selected to compensate for computation-induced round-off errors that occur at least during the determination of the displayable faces and to enable a correct interpretation, consistent with a definition of a solid, that eliminates dangling faces and edges.

17. A method for generating displayable information that is expressive of a three dimensional solid, comprising the steps of:

expressing the solid in a Constructive Solid Geometry representation thereof so as to be comprised of one or more primitive objects, the one or more primitive objects each being comprised of a plurality of faces;

repetitively evaluating a sequence of one or more primitive objects to determine a correct image of a product of the primitive objects;

for each repetitive evaluation, incrementing a count;

detecting a condition wherein the count indicates that a plurality of consecutive evaluations occur without causing a change in a tentative image of the product; and generating a signal for causing the step of repetitively evaluating to terminate when a number of consecutive evaluations occur that result in no change in the tentative image of the product, wherein the number is sufficient to construct the correct image of the product and is less than the square of the number of primitive objects in the product.

18. A method as set forth in claim 17 wherein the step of evaluating includes a step of comparing a depth, relative to a reference plane, of a point on a face of the primitive object being evaluated to a depth of a first point stored within a first depth buffer means (Z3) and also to a depth of a second point stored within a second depth buffer means (Z2), wherein the depths of the first point and the second point are determined during a prior evaluation of the same or of another primitive object.

19. A method as set forth in claim 18 wherein the step of evaluating includes a step of replacing the depth stored within Z3 with the depth (z) of a current point when $Z2 < Z < Z3$.

20. A method as set forth in claim 18 wherein the step of evaluating includes a step of replacing the depth stored within Z3 with the depth (Z) of a current point when $Z2 < Z < Z3$, and further includes a step of resetting the counting means to a value that is less than the number of primitive objects.

21. A method as set forth in claim 18 wherein the step of evaluating includes a step of replacing the depth stored within Z3 with the depth of the current point (Z) when $Z2 + eps < Z < Z3 + eps$, wherein eps is a tolerance value.

22. A method as set forth in claim 18 wherein the step of evaluating includes the steps of:

replacing the depth stored within Z3 with the depth (Z) of a current point when $Z2 < Z < Z3$; and recording, for a line projected from the reference plane through the current point, a number of faces, of the primitive object being evaluated, that are intersected by the line.

23. A method as set forth in claim 22 and further comprising a step of replacing the depth stored within Z2 with the depth stored within Z3 only when the recorded number of faces indicates that the current point lies on or within a primitive object being evaluated.

24. A method as set forth in claim 23 wherein Z3 has an associated intensity buffer I3, wherein Z2 has an associated intensity buffer I2, and further including a step of replacing the intensity stored within I2 with the intensity stored within I3 only when the current point lies on a front face of the primitive object.

25. A method as set forth in claim 23 wherein the step of generating a signal includes a step of replacing a depth stored within a third z-buffer means (Z1) with the depth stored within Z2, only if $Z2 < Z1$.

26. A method as set forth in claim 18 wherein the reference plane is partitioned into a plurality of pixels and wherein the step of evaluating includes the steps of:

projecting from points on a face of the primitive object to the reference plane; and determining which pixel or pixels are covered by the face, wherein a pixel is determined to be covered only if a center of the pixel lies within the projection from the points on the face of the primitive object.

27. A method as set forth in claim 18 wherein the reference plane is partitioned into a plurality of pixels and wherein the step of evaluating includes a step of projecting from a point on a face of the primitive object to the reference plane to determine a depth of the point from a pixel, and wherein the determined depth is referenced to a center of the pixel.

28. A method as set forth in claim 18 and further comprising a step of storing a depth, referenced to a plane of a light source that illuminates the solid, of a projection from a point on a face of the primitive object to the plane of the light source, the depth being stored within a shadow depth buffer means (ZS).

29. A method as set forth in claim 28 and further comprising a step of comparing a depth of a point, referenced to the reference plane, to the depth stored within ZS for determining if the point is visible from the light source.

30. A method for generating displayable information that is expressive of a three dimensional solid, comprising the steps of:

expressing the solid in a Constructive Solid Geometry representation thereof so as to be comprised of one or more primitive objects; and evaluating a sequence of one or more primitive objects to determine a correct image of a product of the primitive objects; wherein the step of evaluating includes a step of projecting from points on a face of the primitive object to a reference plane, the reference plane being partitioned into a plurality of pixels, to determine which pixel or pixels are covered by the face, the step of projecting including a step of determining that a given pixel is covered only if a consistent point of the pixel lies within the projection from the points on the face of the primitive object, the consistent point being independent of an inclination of the face with respect to the reference plane, wherein the step of evaluating includes an initial step of determining a reference depth to an initially evaluated pixel that is covered by the projection of the face, the reference depth being determined from the consistent point of the initially evaluated pixel to a point on the face that projects onto the initially evaluated pixel, and wherein the reference depth is subsequently employed in determining a depth to points on the face that project onto other pixels.

31. A method for generating displayable information that is expressive of a three dimensional solid, comprising the steps of:

expressing the solid in a Constructive Solid Geometry representation thereof so as to be comprised of one or more primitive objects; and evaluating the one or more primitive objects to determine displayable faces thereof; wherein the step of evaluating includes a step of comparing a depth, relative to a reference plane, of a point on a face of the primitive object being evaluated to a depth of a first point stored within a first depth buffer means and also to a depth of a second point stored within a second depth buffer means, and wherein the step of comparing compares the depths to using a predetermined depth tolerance value, the predetermined depth tolerance value being selected to compensate for computation-induced round-off errors that occur at least during the determination of the displayable faces and to enable a correct interpretation, consistent with a definition of a solid, that eliminates dangling faces and edges.

32. A method for generating displayable information that is expressive of a three dimensional solid, comprising the steps of:

expressing the solid in a Constructive Solid Geometry representation thereof so as to be comprised of one or more primitive objects; and evaluating the one or more primitive objects to determine displayable faces thereof; wherein the step of evaluating includes the steps of repetitively comparing depths of points on faces of primitive objects being evaluated to previously determined depths;

storing depths, within a depth buffer means (Z1), of each point determined to lie on displayable faces of the primitive objects, the depth being relative to a reference plane;

comparing a depth of points on front-facing faces of the primitive objects to a corresponding depth stored within Z1; and storing within an intensity buffer means (I1) intensities of points on the front-facing surfaces having a depth determined to be equal to the corresponding depth stored within Z1; wherein the step of repetitively comparing and the step of comparing each compare the depths using a predetermined depth tolerance value, the predetermined depth tolerance value being selected to compensate for computation-induced round-off errors that occur at least during the determination of the displayable faces and to enable a correct interpretation, consistent with a definition of a solid, that eliminates dangling faces and edges.

33. A method for generating displayable information for representing a solid that is expressed in a Constructive Solid Geometry representation that includes one or more primitives, the one or more primitives each being comprised of a plurality of faces, comprising the steps of:

repetitively evaluating a sequence of one or more primitives to determine a correct image of a product of the primitives, the step of repetitively evaluating including a step of determining depths to faces of the primitives, referenced to a pixel plane, using a predetermined depth tolerance value, the predetermined depth tolerance value being selected to compensate for computation-induced round-off errors and to reduce a probability of an occurrence of a singularity in the displayable information;

for each repetitive evaluation, incrementing a count;

detecting a condition wherein the count indicates that a plurality of consecutive evaluations occur without causing a change in a tentative image of the product; and generating a signal for causing the step of repetitively evaluating to terminate when a number of consecutive evaluations occur that are sufficient to construct the correct image of the product, wherein the number is less than the square of the number of primitives in the product.

34. A method as set forth in claim 33 wherein the step of repetitively evaluating includes an initial step of determining a reference depth to an initially evaluated pixel that is covered by the projection of a face, the reference depth being determined from a geometric center of the initially evaluated pixel to a point on the face that projects onto the initially evaluated pixel, and wherein the reference depth is subsequently employed in determining a depth to points on the face that project onto other pixels.

35. Apparatus for generating displayable information for representing a solid that is expressed in a Constructive Solid Geometry representation that includes one or more primitives, the one or more primitives each being comprised of a plurality of faces, comprising:

means for repetitively evaluating a sequence of one or more primitives to determine a correct image of a product of the primitives, said means for repetitively evaluating including means for determining depths to faces of the primitives, referenced to a pixel plane, using a predetermined depth tolerance value, the predetermined depth tolerance value being selected to compensate for computation-induced round-off errors and to reduce a probability of an occurrence of a singularity in the displayable information;

means, responsive to each repetitive evaluation, for incrementing a counter means;

means for detecting a condition wherein said counter means indicates that a plurality of consecutive evaluations occur without causing a change in a tentative image of the product; and means for generating a signal for causing the operation of said evaluating means to terminate when a number of consecutive evaluations occur that are sufficient to construct the correct image of the product, wherein the number is less than the square of the number of primitives in the product.

36. Apparatus as forth in claim 35 wherein said evaluating means includes means for determining a reference depth to an initially evaluated pixel that is covered by the projection of a face, the reference depth being determined from a geometric center of the initially evaluated pixel to a point on the face that projects onto the initially evaluated pixel, and wherein the reference depth is subsequently employed by said evaluating means in determining a depth to points on the face that project onto other pixels.

* * * * *